Figure 1:
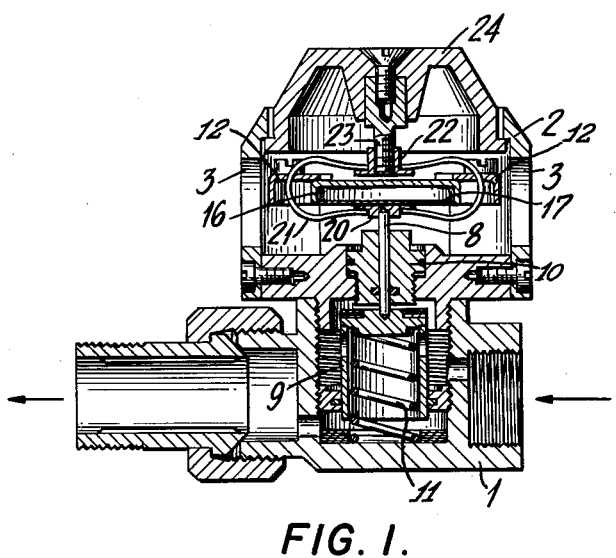

Nov. 13, 1962  K. PORLAND ETAL  3,063,640
THERMOSTATIC REGULATING DEVICE
Original Filed Feb. 6, 1959

United States Patent Office 3,063,640
Patented Nov. 13, 1962

3,063,640
THERMOSTATIC REGULATING DEVICE
Kjeld Porland and Carl Sørensen, Nordborg, Als, Denmark, assignors to Danfoss ved Ingenior Mads Clausen, Nordborg, Als, Denmark, a company of Denmark
Original application Feb. 6, 1959, Ser. No. 791,578, now Patent No. 2,997,241, dated Aug. 22, 1961. Divided and this application Dec. 7, 1960, Ser. No. 74,404
Claims priority, application Denmark Feb. 6, 1958
1 Claim. (Cl. 236—99)

This invention relates to a thermostatic regulating element for a spring-activated control device, preferably a valve body, and consisting of an exchangeable casing in which is contained a feeler with a movable wall which is in connection with an axially-displaceable stem acting on the control device, the movable wall for varying the steam pressure necessary for displacing the stem being subjected to spring action directed against the wall.

It is the object of the invention to provide a regulating element of the character indicated without a protruding feeler, which is easy to adjust and to replace, in which the feeler is not subjected to torsional stresses when the operating control of the regulating element is turned in order to vary the working pressure in the feeler, and in which adjustments in the tension of the spring involve no displacement of the valve body towards its closing position. This is accomplished in accordance with the invention by means of a regulating element wherein the end of the displaceable stem which faces the feeler is guided in a sleeve attached to the movable end bottom of the feeler, and for adjusting the tension of the spring acting on the movable end bottom of the feeler, and consequently the working pressure necessary for displacing the stem, there are provided means which are movable in relation to each other longitudinally of the stem and serve to transmit, without producing any torsional stresses on the feeler, a variation, produced by turning an operating handle, in the force exerted by the spring on the movable end bottom of the feeler.

An essential feature of the regulating valve, according to the invention, is that the feeler is a membrane box attached in the regulating casing and has a resilient end bottom or membrane. Attached to the sleeve mounted on this membrane is one end of a pair of curved laminated springs which surround the membrane box, the other end of the springs being attached to a sleeve with an inside screwthread. In order to tension the spring, the sleeve may be moved on a screwthreaded stem, one end of which is adapted to rest on the fixed end bottom of the membrane box while its other end carries an operating handle.

The regulating element is particularly intended to be mounted on a radiator valve with a relieved valve body. Thus, the valve stem may be made of thin material having low thermal conductivity, for example, stainless steel, as a result of which the amount of heat that can be transmitted from the valve body is negligible and does not influence the function of the regulating element. The device of this invention requires a minimum of material for its manufacture and is low in height.

Figure 2:
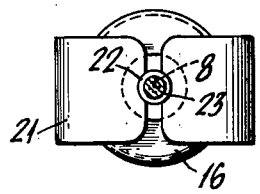

The invention will now be explained in detail with reference to the drawing, in which FIG. 1 is a section of a valve with a regulating element embodying features of the invention and including a membrane box on which laminated springs act;

FIG. 2 is a top plan view of the feeler shown in FIG. 1.

On a valve casing 1 there is mounted a regulating element with a cylindrical casing 2 the side walls of which are provided with flow openings 3 for the air in the room so that this air has free access to a feeler contained within the casing 2. The feeler is a membrane box with a movable end bottom or membrane 17 on which a sleeve 20 is mounted. On the sleeve 20 are mounted a pair of curved laminated springs 21 (FIG. 2), which are bent over the membrane box 16, their other ends being attached to a sleeve 22 having an inside screwthread and being capable of moving along a similarly screwthreaded stem 23 when the latter is turned by means of the operating handle 24 which is rotatable within the casing 2. Guided in the sleeve 20 is the end of a valve stem 8 carrying a cylindrical pressure-relieved valve body 9, the stem 8 extending through a guide plug 10 threadedly engaged in the casing 2, and the valve body 9 being biased upwardly by a spring 11. The movements of the end bottom or membrane 17 are thus transmitted to the valve body 9 through the stem 8. The membrane box 16 is held in position by arms 12 extending from the walls of the casing 2 at the sides of the openings 3. The springs 21 extend between these arms.

The tension of the springs 21 and consequently the steam pressure in the feeler necessary for moving the valve stem is regulated by manually turning the operating handle 24 relatively to the casing 2. The stem 23 is screw threaded and it threadedly engages the screw threaded sleeve 22. Consequently, upon rotation of casing 24, the stress on the feeler springs 21 is readily varied in response to such rotation by reason of the threaded engagement between elements 22 and 23. Thus, the springs 21 will compress the membrane box 16 in varying predetermined degrees so that the amount of steam pressure necessary for closing the valve, and consequently the temperature in the room, may be varied. The valve body 9 does, therefore, not change its position during regulation and may during any adjustment travel freely between fully open and fully closed positions.

This is a division of our copending application, Serial No. 791,578 filed February 6, 1959 now patent No. 2,997,241.

What we claim and desire to secure by Letters Patent is:

In combination with a valve casing and a spring-activated valve body contained therein, a thermotatic control unit for said spring-activated valve body said unit comprising, in combination, a housing connected to said valve casing, regulating handle means rotatable relatively to said housing, a stem carried by said handle means and extending into said housing, said stem having an externally-threaded portion, and an internally-threaded sleeve mounted on said threaded portion, an extensible membrane box responsive to temperature contained in said housing, said body having an elastic movable wall having a socket secured thereto, a longitudinally-displaceable spindle having one end engaged in said socket and having its other end engaged with said valve body, whereby said spindle is positioned to transmit its longitudinal movements to said valve body, and spring means biasing said movable wall, said spring means comprising a pair of U-shaped leaf springs extending around said membrane box with one end of said springs engaging said sleeve and the other end of said springs being positioned to exert pressure upon said movable wall, whereby said springs resiliently act between said wall and said internally-threaded sleeve.

References Cited in the file of this patent
UNITED STATES PATENTS

| 850,923   | Gold    | Apr. 23, 1907 |
| 1,208,130 | Fulton  | Dec. 12, 1916 |
| 1,916,814 | Shivers | July 4, 1933  |
| 2,037,142 | Newell  | Apr. 14, 1936 |